(12) United States Patent
Hoffmann

(10) Patent No.: US 8,746,280 B2
(45) Date of Patent: Jun. 10, 2014

(54) CONTROLLABLE VALVE FOR AN AIRCRAFT

(75) Inventor: Lars Hoffmann, Stuhr (DE)

(73) Assignee: Airbus Operations GmbH, Hamburg (DE)

( * ) Notice: Subject to any disclaimer, the term of this patent is extended or adjusted under 35 U.S.C. 154(b) by 597 days.

(21) Appl. No.: 12/725,670

(22) Filed: Mar. 17, 2010

(65) Prior Publication Data

US 2010/0252114 A1 Oct. 7, 2010

Related U.S. Application Data

(60) Provisional application No. 61/166,876, filed on Apr. 6, 2009.

(51) Int. Cl.
*F16K 11/065* (2006.01)

(52) U.S. Cl.
USPC ........................................ 137/625.48; 251/65

(58) Field of Classification Search
USPC ................. 137/625.25, 625.4, 625.48, 625.5, 137/625.65; 251/65, 129.1
See application file for complete search history.

(56) References Cited

U.S. PATENT DOCUMENTS

| | | | | |
|---|---|---|---|---|
| 2,243,344 A | * | 5/1941 | Karst | 137/312 |
| 3,202,886 A | * | 8/1965 | Kramer | 335/234 |
| 3,460,081 A | * | 8/1969 | Tillman | 335/234 |
| 3,728,654 A | * | 4/1973 | Tada | 335/234 |
| 4,253,493 A | | 3/1981 | English | |
| 4,538,129 A | * | 8/1985 | Fisher | 335/230 |
| 4,751,487 A | * | 6/1988 | Green, Jr. | 335/234 |
| 4,845,392 A | | 7/1989 | Mumbower | |
| 6,073,904 A | * | 6/2000 | Diller et al. | 251/30.03 |
| 6,246,131 B1 | | 6/2001 | Sheng | |

FOREIGN PATENT DOCUMENTS

| | | |
|---|---|---|
| DE | 20 13 051 | 10/1971 |
| DE | 28 26 212 | 3/1979 |
| DE | 34 01 598 | 9/1984 |
| DE | 33 12 054 | 10/1984 |
| DE | 35 00 530 | 7/1986 |
| DE | 19 958 888 | 6/2001 |
| DE | 600 21 062 | 5/2006 |

OTHER PUBLICATIONS

German Office Action for DE 10 2009 003214.5 dated Dec. 18, 2009.

* cited by examiner

*Primary Examiner* — John Fox
(74) *Attorney, Agent, or Firm* — Jenkins, Wilson, Taylor & Hunt, P.A.

(57) ABSTRACT

A controllable valve is provided for a low-flammability fluid within an aircraft with at least one magnetic coil which, upon brief electrical excitation, moves a structural element provided therein from a first position to a second position in which the structural element is held by a permanent magnet after completion of the electrical excitation of the magnetic coil.

15 Claims, 8 Drawing Sheets

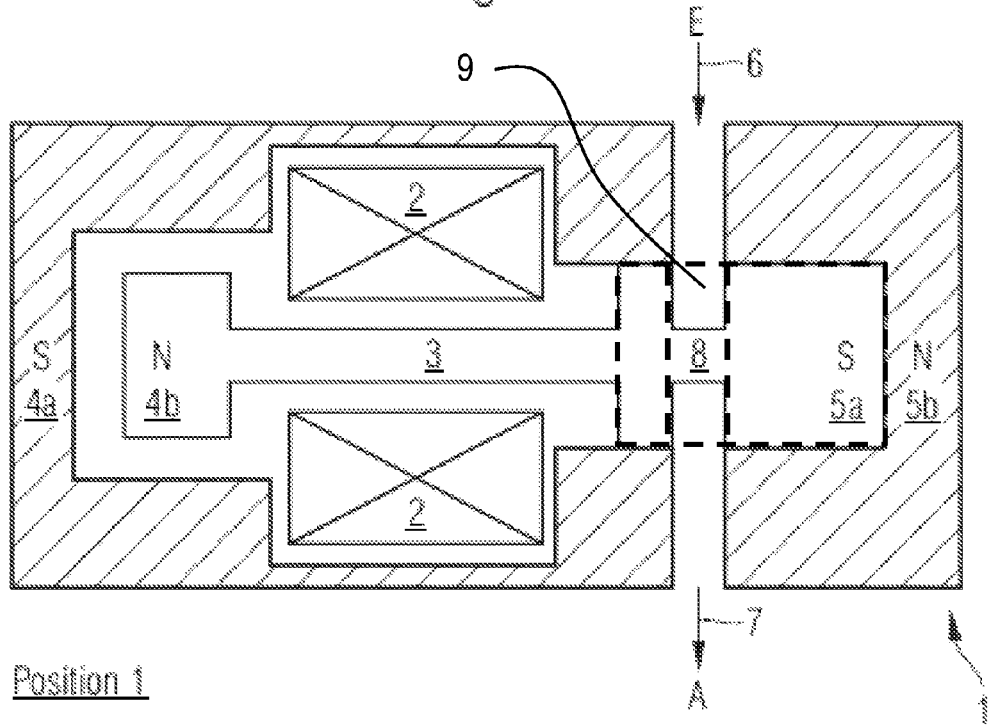
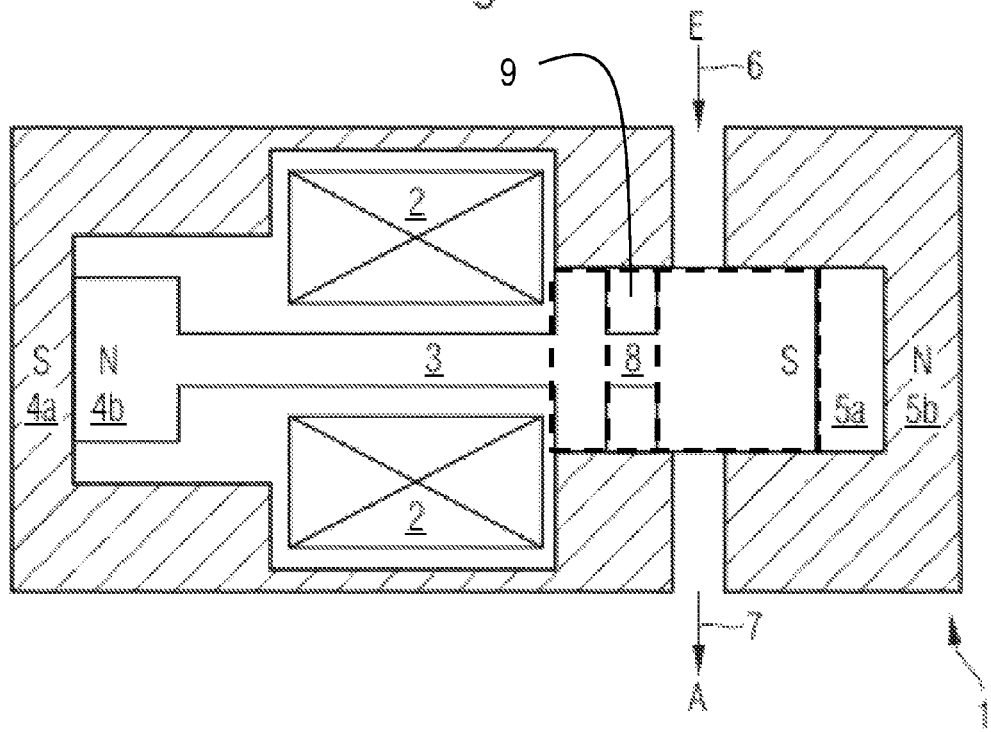

Position 1

Position 2

Position 1

Position 2

Position 2
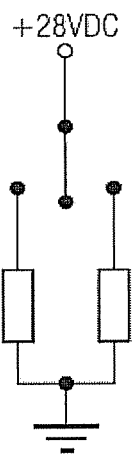
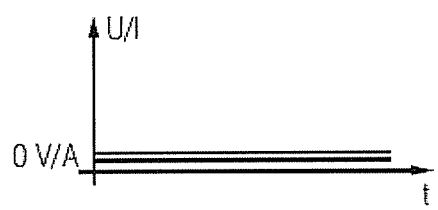
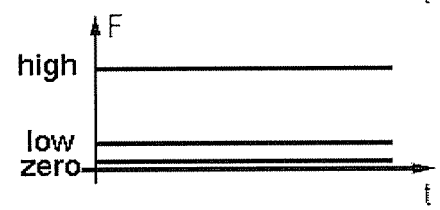
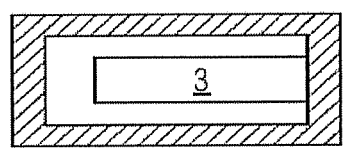
Fig. 5C
actuation 2 ⟿ 1
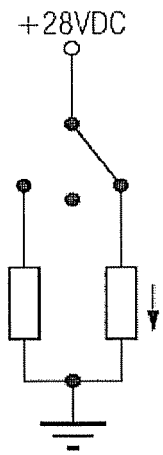
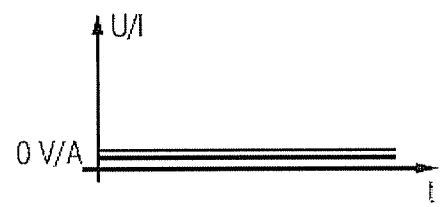
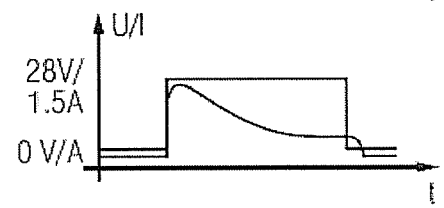
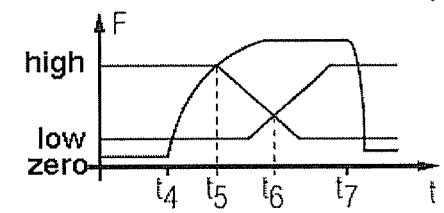
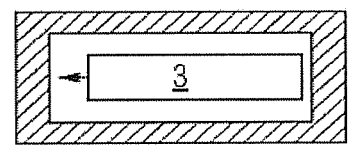
Fig. 5D Position 1
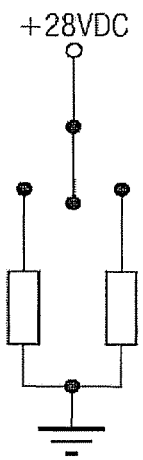
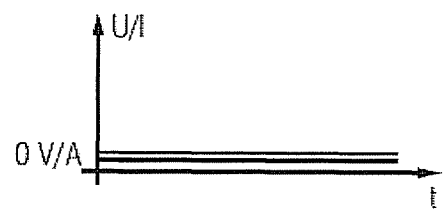
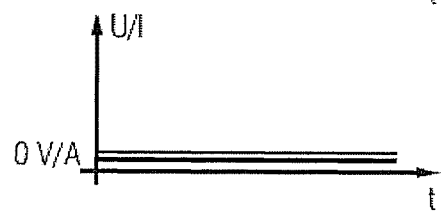
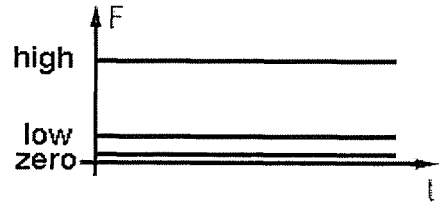
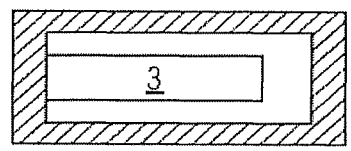
Fig. 5E

CONTROLLABLE VALVE FOR AN AIRCRAFT

CROSS-REFERENCE TO RELATED APPLICATIONS

This application claims the benefit of U.S. Provisional Application No. 61/166,876, filed Apr. 6, 2009, the entire disclosure of which is herein incorporated by reference.

The invention relates to a controllable valve for a low-flammability fluid within an aircraft and to a method for controlling a mass flow of a low-flammability fluid.

TECHNICAL BACKGROUND

A valve, in particular a solenoid valve, is a technical structural part used to control or regulate a mass flow of a gas or a liquid. A solenoid valve contains an electromagnet which can be activated by switching a switch on or off.

An aircraft contains a large number of hydraulic lines of one or more hydraulic circuits. Hydraulic lines of this type can be used to actuate control surfaces, in particular flyer plates, for example. A hydraulic fluid is transported in the hydraulic lines, the flow of the hydraulic fluid being controlled or regulated by means of valves.

In addition to the hydraulic circuits, an aircraft also contains water circuits in order to supply the passengers, in particular the passenger toilets, with water, for example. These water circuits are also controlled or regulated by means of switching valves.

In addition to these low-flammability fluids, that is to say hydraulic oil and water, an aircraft, in particular an aeroplane, carries a large amount of high-flammability fuel, in particular kerosine, in order to operate the engines and to generate sufficient thrust.

A large part of this high-flammability fuel is located in the central region of the fuselage and in particular also in the wings of an aeroplane. For actuating control surfaces, hydraulic lines, in particular, therefore extend in local proximity to fuel tanks and fuel lines.

Conventional solenoid valves used in aeroplanes switch an armature element from a first switching position to a second switching position by means of at least one magnetic coil. After switching-over, the armature element is conventionally held mechanically by means of a spring mechanism or in another manner. Alternatively, after the excitation of the magnetic coil has been switched off, the armature element is moved back in a spring-loaded manner to the starting position or starting stance again.

However, these conventional solenoid valves have the drawback that they are, on account of the structural parts necessary for the mechanical interlocking and owing to this mechanical wear, relatively fault-prone or display low reliability. In addition, the mechanical structural parts used for the mechanical interlocking greatly limit the extent to which it is possible to miniaturise the solenoid valve.

It is therefore an object of the present invention to provide a controllable valve for a fluid within an aircraft that is distinguished by high reliability and a long lifetime and at the same time minimises the risk of ignition of fuel of the aircraft.

SUMMARY OF THE INVENTION

The invention provides a controllable valve for a low-flammability fluid within an aircraft with at least one magnetic coil which, upon brief electrical excitation, moves a structural element provided therein from a first position to a second position in which the structural element is held by a permanent magnet after completion of the electrical excitation of the magnetic coil.

The controllable valve according to the invention is particularly suitable for controlling and regulating a hydraulic fluid within a hydraulic circuit of the aircraft or a different low-flammability fluid, such as for example water within a water circuit of the aircraft.

After completion of the brief electrical excitation of the magnetic coil provided in the controllable valve, the actuated structural element, which is provided for opening or closing the respective circuit, is held by means of one or more permanent magnets in the position reached. After the switching process, the magnetic coil is thus no longer live, so that any escaping fuel cannot ignite within the aircraft. As a result, the valve according to the invention significantly increases protection from ignition of fuel which has accidentally escaped.

A further advantage of the controllable valve according to the invention consists in the fact that it does not require any complex mechanical interlocking mechanism, for example with one or more springs, and thus displays no or very low mechanical wear. The lifetime or service life of the controllable valve according to the invention is therefore exceptionally long.

A further advantage of the controllable valve according to the invention for a low-flammability fluid within an aircraft consists in the fact that it may be miniaturised in a simple manner, in particular as no complex mechanical interlocking mechanism has to be provided.

In accordance with the invention, a further advantage of the controllable valve according to the invention consists in the fact that the energy used for actuating the structural element and the waste heat associated therewith are very low. Furthermore, the controllable valve according to the invention is distinguished by very short switching times.

A further advantage of the controllable valve according to the invention for a low-flammability fluid within an aircraft consists in the fact that fitting the valve requires very little effort, as no complex mechanical interlocking mechanism is provided.

In a possible embodiment of the controllable valve according to the invention, said valve comprises two permanent magnets, a first permanent magnet holding the structural element in the first position before the electrical excitation of the magnetic coil and the second permanent magnet holding the structural element in the second position after completion of the electrical excitation of the magnetic coil.

In this case, the tensile force exerted by the magnetic coil on the structural element upon electrical excitation is preferably greater than an opposing holding force exerted by the first permanent magnet on the structural element.

In a further possible embodiment of the controllable valve according to the invention, this controllable valve has not just one but two magnetic coils, a first magnetic coil moving, upon electrical excitation, the structural element from the first position, counter to a holding force of the first permanent magnet, to the second position in which the structural element is held by the second permanent magnet after completion of the electrical excitation of the first magnetic coil, and a second magnetic coil moving, upon electrical excitation, the structural element from the second position, counter to a holding force of the second permanent magnet, to the first position in which the structural element is held by the first permanent magnet after completion of the electrical excitation of the second magnetic coil.

This embodiment with two magnetic coils and two associated permanent magnets is thus distinguished by a symmetrical construction.

An alternative embodiment of the controllable valve according to the invention provides just one magnetic coil, the polarity of which is, however, reversible. This embodiment offers the advantage of being less complex than an embodiment with two magnetic coils.

In one embodiment of the controllable valve according to the invention, the linearly movable structural element comprises an opening which connects a fluid supply line and a fluid discharge line to each other in one of the two positions of the structural element and separates them from each other in the other position of the structural element.

In an alternative embodiment, the linearly movable structural element comprises not an opening but a taper which connects a fluid supply line and a fluid discharge line to each other in one of the two positions of the structural element and separates them from each other in the other position of the structural element.

In a possible embodiment of the controllable valve according to the invention, the linear movement of the structural element from the first position to the second position causes a control stroke which is hydromechanically intensified to form a working stroke.

In a further embodiment of the controllable valve according to the invention, the structural element comprises an opening or a taper which, in one of the two positions of the structural element, connects a fluid supply line to a first fluid discharge line and which, in the other of the two positions of the structural element, connects the fluid supply line to a second fluid discharge line.

In this embodiment, the controllable valve serves not to close or break a circuit, but to switch over between two fluid discharge lines or circuits.

The controllable valve according to the invention is suitable for controlling and regulating any desired low-flammability fluid within an aeroplane, in particular a low-flammability gas, gas mixture or a low-flammability liquid or a low-flammability liquid mixture. The controllable valve according to the invention can in particular be used for controlling and regulating a low-flammability hydraulic fluid or water flow within the aircraft.

In a possible embodiment of the controllable valve according to the invention, the structural element is cylindrical and moves linearly in a cylindrical housing.

The structural element is made preferably of metal, the two end faces comprising ferromagnetic material. The use of what are known as rare earths allows a maximum magnetic force or tensile force to be achieved.

The magnetic coil of the controllable valve according to the invention can be activated by a controller.

In a possible embodiment, the duration of the electrical excitation of the magnetic coil is less than 500 msec.

BRIEF DESCRIPTION OF FIGURES

Embodiments of the valve according to the invention will be described hereinafter in detail with reference to the appended figures.

In the drawings:

FIGS. 1A, 1B show a first embodiment of the controllable valve according to the invention in two switching positions;

FIGS. 5A-5E are diagrams for illustrating the precise mode of operation of a controllable valve according to the invention with a low-flammability fluid within an aircraft.

DETAILED DESCRIPTION OF EMBODIMENTS

Figure 2A:
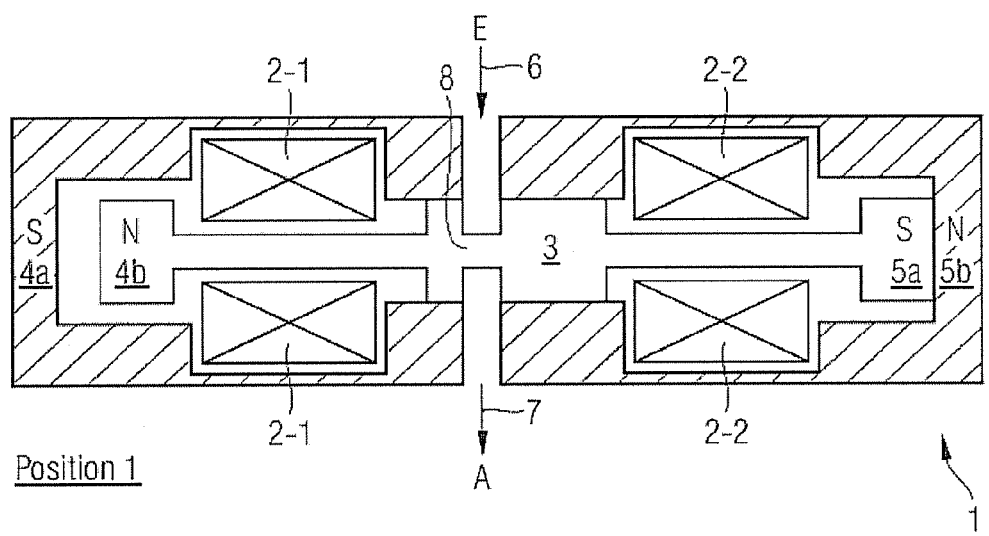
FIGS. 2A, 2B show a second embodiment of the controllable valve according to the invention in two switching positions.

FIGS. 1-3 show three variant embodiments of a controllable valve 1 according to the invention for switching, controlling or regulating a flow of low-flammability fluid, in particular for a flow of hydraulic fluid within an aircraft. As may be seen from FIGS. 1A, 1B, the embodiment shown there of the controllable valve 1 contains a magnetic coil 2 in which a control circuit (not shown) is electrically excitable. A structural element 3 provided in the valve 1 can be moved linearly from the first position illustrated in FIG. 1A to the second position illustrated in FIG. 1B by electrical excitation of the magnetic coil 2. As illustrated in FIG. 1B, the structural element 3 is held by a first permanent magnet or a first pair of permanent magnets 4a, 4b after completion of the electrical excitation of the magnetic coil 2. In the starting position according to FIG. 1A, the linear structural element 3 is held by a second permanent magnet or a second pair of permanent magnets 5a, 5b.

On actuation of the valve 1, the mechanical unit or the mechanical structural element 3 performs a linear movement or a mechanical stroke. As a result of this linear movement, a fluid supply line 6 is connected to a fluid discharge line 7 or alternatively separated therefrom. In a possible embodiment, the linearly movable mechanical structural element 3 is embodied cylindrically and comprises at its end faces ferromagnetic material which forms a part of the two opposing permanent magnets, this ferromagnetic material of the structural element 3 interacting with a corresponding ferromagnetic material of a cylindrical housing of the controllable valve 1.

In the embodiment illustrated in FIGS. 1A, 1B, the cylindrical linearly movable structural element 3 comprises a taper 8. In the switching position illustrated in FIG. 1A, the fluid supply line 6 is connected to the fluid discharge line 7 via the taper 8 provided in the cylinder 3 at this point. In the switching position illustrated in FIG. 1A, the controllable valve 1 is thus in an opened switching stance in which a fluid, in particular a hydraulic fluid, passes from the supply line 6 directly to the fluid discharge line 7. Upon electrical excitation of the magnetic coil 2, a tensile force, which counteracts and exceeds the holding force of the second pair of permanent magnets 5a, 5b, is exerted on the linearly movable structural element 3. Upon excitation of the magnetic coil 2, the structural element 3 moves, assisted by the tensile force of the first pair of permanent magnets 4a, 4b, from the switching position illustrated in FIG. 1A, in which the valve 1 is open, to the switching position illustrated in FIG. 1B, in which the valve 1 is closed. As may be seen in FIG. 1B, the taper 8 in the cylindrical structural element 3 is no longer located in the region of the fluid supply and discharge lines 6, 7, so that the fluid circuit is broken. The structural element or the armature 3 is held in the switching position according to FIG. 1B by the pair of permanent magnets 4a, 4b.

In the first embodiment illustrated in FIGS. 1A, 1B, the controllable valve 1 according to the invention comprises a single magnetic coil 2. In this case, the magnetic coil 2 is preferably reversible in its polarity. On actuation of the magnetic coil 2 with reversed polarity, the structural element 3 is moved from the second switching position illustrated in FIG. 1B back to the original switching position illustrated in FIG. 1A. In this case, upon electrical excitation, the tensile force exerted by the magnetic coil 2 is greater than the holding force exerted by the pair of permanent magnets 4a, 4b.

In the embodiment illustrated in FIGS. 1A, 1B, the linearly movable structural element or the armature 3 comprises a taper 8. In an alternative embodiment, the linearly movable structural element 3 can comprise an opening 9 as shown by a dashed line in FIGS. 1A and 1B, through which fluid flows, when the controllable valve 1 is opened, from the fluid supply line 6 to the fluid discharge line 7. In another switching position, the opening is laterally offset, the fluid supply line 6 being separated from the fluid discharge line 7.

In a possible embodiment of the controllable valve 1 according to the invention, the stroke exerted forms a control stroke which is hydromechanically intensified to form a working stroke.

The duration of the electrical excitation of the magnetic coil 2 is preferably less than 500 msec, so that the magnetic coil 2 is live only for a relatively short period of time and thus does not form a potential ignition source for igniting the aeroplane fuel.

Figure 2B:
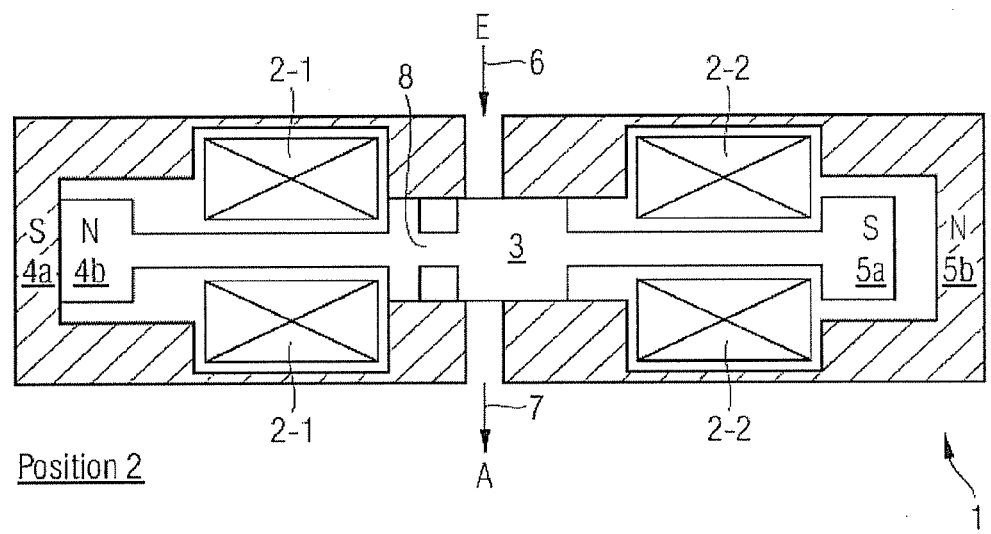

FIGS. 2A, 2B show a second embodiment of the controllable valve 1 according to the invention in two switching positions. In the variant embodiment illustrated in FIGS. 2A, 2B of the valve 1, said valve comprises two magnetic coils 2-1, 2-2. Upon electrical excitation of the first magnetic coil 2-1, the structural element 3 is brought from the position illustrated in FIG. 2A, counter to the holding force of the pair of permanent magnets 5a, 5b, to the second switching position, such as is illustrated in FIG. 2B. In this second switching position, the structural element 3 is held by the other permanent magnet or the other pair of permanent magnets 4a, 4b after completion of the electrical excitation of the first magnetic coil 2-1. Upon brief electrical excitation of the second magnetic coil 2-2, the structural element 3 is moved back from the second position illustrated in FIG. 2B, counter to the holding force of the pair of permanent magnets 4a, 4b, to the first switching position, the structural element 3 being held by the pair of permanent magnets 5a, 5b after completion of the electrical excitation of the second magnetic coil 2-2. Alternating excitation or activation of the two magnetic coils 2-1, 2-2 allows the controllable valve 1 to be switched back and forth between the open switching position according to FIG. 2A and the closed switching position according to FIG. 2B. In an alternative embodiment, the two magnetic coils 2-1, 2-2 act in an equivalent manner, their polarities each being reversible.

Figure 3A:
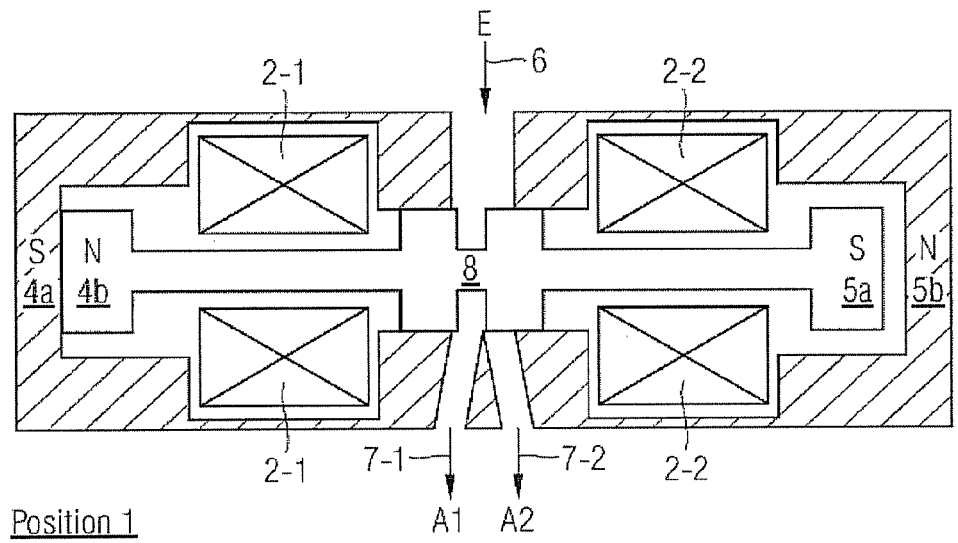
FIGS. 3A, 3B show a third embodiment of the controllable valve according to the invention in two switching positions, wherein the controllable valve comprises two fluid discharge lines.
Figure 3B:
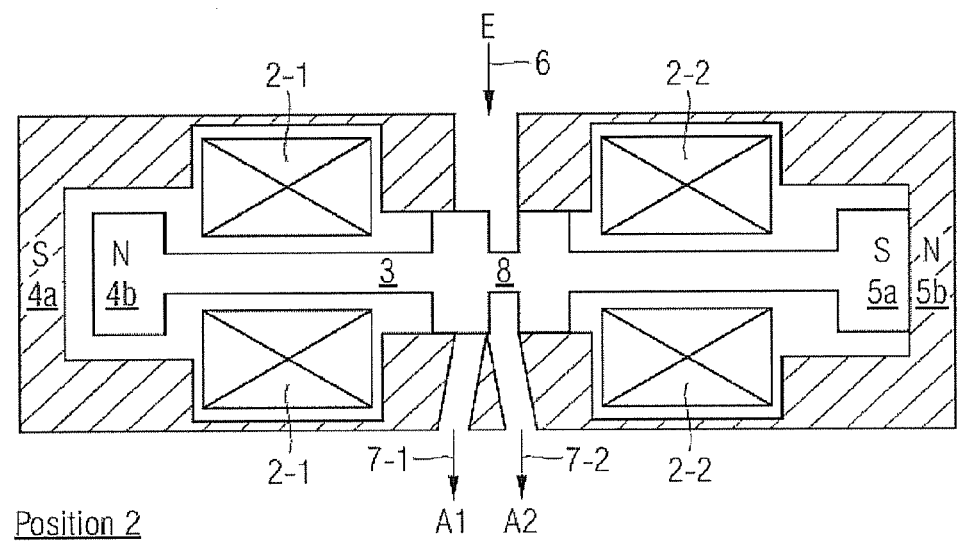
Figure 3C:
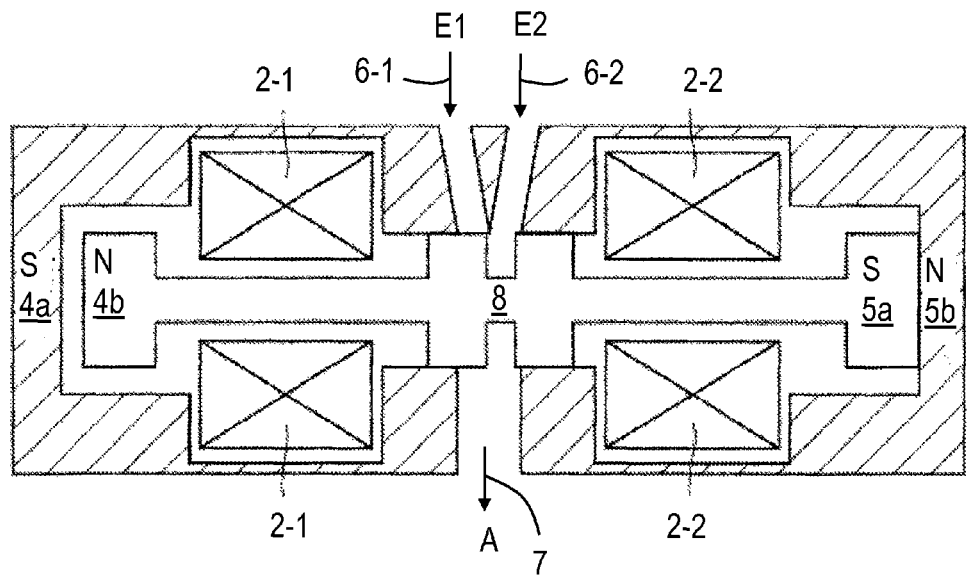
FIGS. 3C, 3D show the third embodiment of the controllable valve according to the invention in two switching positions, wherein the controllable valve comprises two fluid supply lines.
Figure 3D:
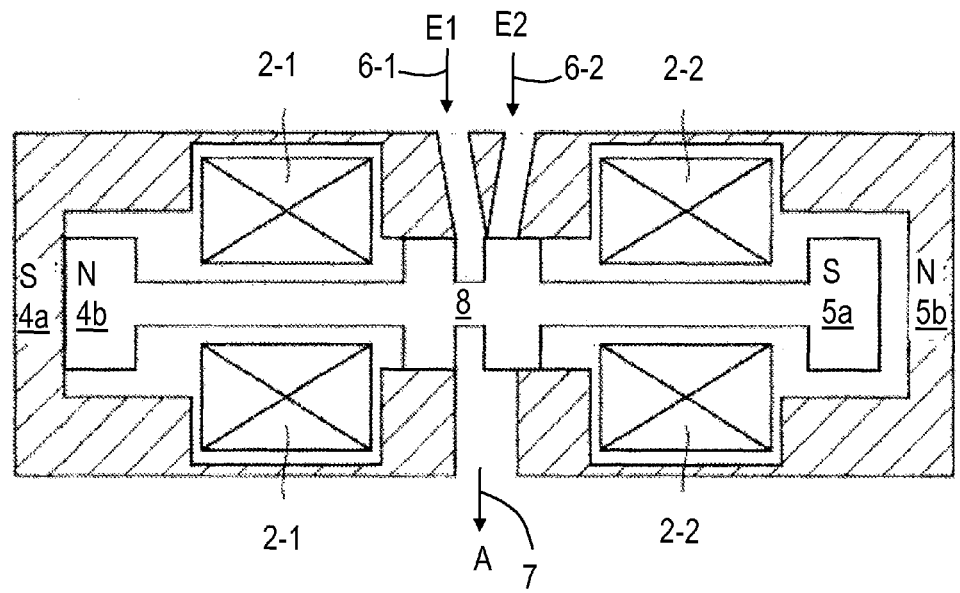

FIGS. 3A, 3B and further FIGS. 3C, 3D show a third variant embodiment of the controllable valve 1 according to the invention. In the variant embodiment shown in FIGS. 3A, 3B, the controllable valve 1 comprises not just one fluid discharge line 7, but two fluid discharge lines 7-1, 7-2. Actuation or activation of the two magnetic coils 2-1, 2-2 causes the structural element 3 to move between two switching positions, the fluid supply line 6 being connected to the first fluid discharge line 7-1 in one of the two positions of the structural element 3 and the fluid supply line 6 being connected to the second fluid discharge line 7-2 in the other of the two positions of the structural element 3. In the switching position illustrated in FIG. 3A, the fluid passes from the fluid supply line 6 to the first fluid discharge line 7-1 via the taper 8 provided in the cylindrical structural element 3. In the switching position illustrated in FIG. 3B, the fluid passes from the fluid supply line 6 to the second fluid discharge line 7-2 via the taper 8.

In the third embodiment illustrated in FIGS. 3A, 3B, it is possible to switch over between two fluid discharge lines 7-1, 7-2 by means of the controllable valve 1. In an alternative embodiment as illustrated in FIGS. 3C and 3D, the controllable valve 1 can be used to switch over between two fluid supply lines 6-1, 6-2.

Figure 4A:
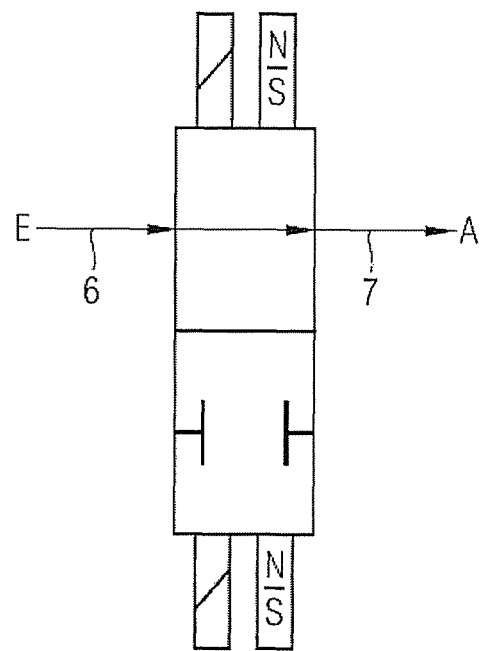
FIGS. 4A, 4B show circuit symbols for the embodiments illustrated in FIGS. 1-3 of the controllable valve according to the invention.

FIG. 4A shows a circuit symbol for a controllable valve 1 according to the invention for the two variant embodiments illustrated in FIGS. 1, 2, in which the valve 1 connects a fluid supply line 6 to a fluid discharge line 7 or separates it therefrom. The circuit symbol indicates the pair of permanent magnets used in this case. Furthermore, in the circuit symbol illustrated in FIG. 4A, the magnetic coils for actuating the valve 1 are illustrated symbolically.

Figure 4B:
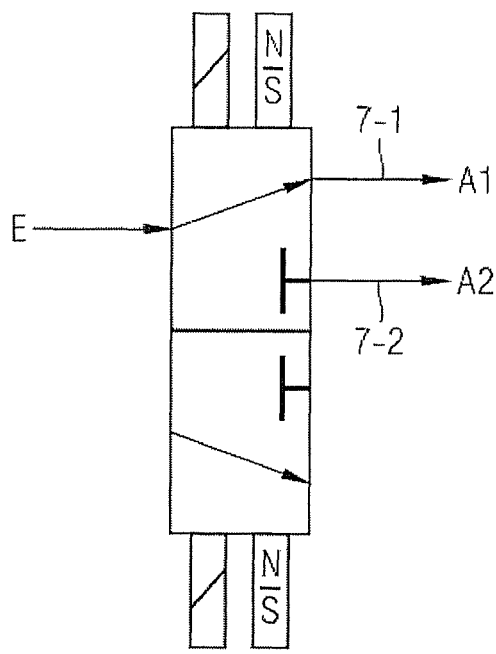

FIG. 4B shows a circuit symbol for the third variant embodiment illustrated in FIGS. 3A, 3B of the controllable valve 1 according to the invention. In this variant embodiment, the controllable valve 1 according to the invention serves as a valve for switching over between two fluid discharge lines 7-1, 7-2.

FIGS. 5A, 5B, 5C, 5D, 5E clarify the mode of operation of the controllable valve 1 according to the invention. The controllable valve 1 comprises, as illustrated in the equivalent circuit diagram, either two excitable magnetic coils or one excitable magnetic coil with reversible polarity.

Figures 5A, 5B:
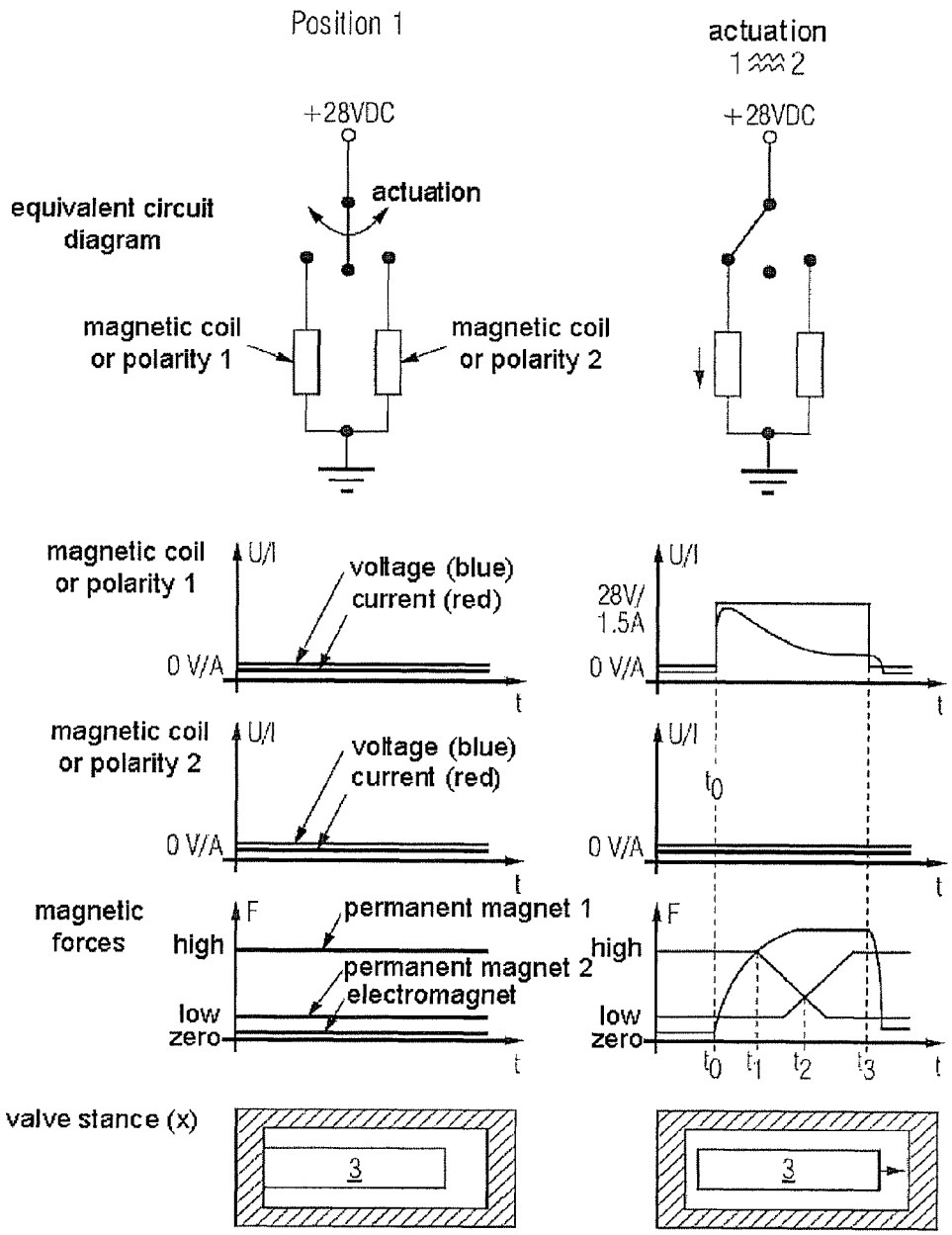

In the switching position 1 according to FIG. 5A, the linearly movable structural element 3 is in the left end position and is held by a permanent magnet. On actuation of a magnetic coil, for example the magnetic coil 2 illustrated in FIG. 1A, at a moment t0 a predefined DC voltage of for example 28 volts DC is applied to the magnetic coil 2 which produces a corresponding flow of current I. The actuated or excited magnetic coil 2 causes a rising tensile force which at a moment t1 exceeds the holding force of the permanent magnet holding the structural element 3 in the left switching stance. Furthermore, the structural element 3 moves, starting from the left switching stance, in the direction toward the right switching position, the holding force of that permanent magnet that has held the structural element 3 in the left switching stance decreasing continuously. Simultaneously with the linear movement of the structural element 3 from the left switching position to the right switching position, the permanent magnet located on the right side exerts an additional tensile force on the structural element 3. At the moment t2, the force of the pair of permanent magnets on the right side or the holding force of this pair of permanent magnets exceeds the holding force of the pair of permanent magnets on the left side and therefore assists the linear movement of the structural element 3 toward the right. As soon as the structural element 3 is in the other switching position or in the right switching position, such as is illustrated in FIG. 5C, the electrical excitation of the magnetic coil 2 is completed at the moment t3, so that the tensile force of the magnetic coil 2 returns to zero, as illustrated in FIGS. 5B, 5C. After completion of the linear movement of the structural element 3, no more current flows through the magnetic coil 2, as is shown in FIG. 5C.

FIGS. 5D, 5E show the movement of the structural element 3 from the right switching position back to the left switching position. At the moment t4, the other magnetic coil or the same magnetic coil is excited with reversed polarity. This takes place by applying a DC voltage which produces a flow of current, as a result of which a tensile force brought about by the magnetic coil is produced and exceeds at the moment t5 the holding force of the pair of permanent magnets on the right side and leads to a linear movement of the structural element 3 toward the left. At the moment t6, the tensile force of the pair of permanent magnets on the left side exceeds the holding force of the pair of permanent magnets on the right side and assists the linear movement of the structural element 3 to the left switching position. After reaching the left switching position, the magnetic coil is not excited any further, as illustrated in FIG. 5E.

The duration of the electrical excitation of the magnetic coil 2 or the difference between the moments t0 and t3 or t4 and t7 is preferably less than 500 msec. The controllable valve 1 according to the invention is therefore live only for a short time during the switching process, so that ignition of a different fluid, in particular of the fuel of an aircraft, is very unlikely.

The holding force of the pair of permanent magnets is designed as a function of the mass or the weight of the linearly movable structural element 3. The greater the mass of the linearly movable structural element 3, the higher the holding force of the pair of permanent magnets is selected to be.

As the controllable valve 1 according to the invention, such as it is illustrated in the embodiments according to FIGS. 1, 2, 3, requires no mechanical interlocking mechanism, in particular no spring structural elements or spring structural parts, the mechanical wear is very low and the service life of the controllable valve 1 is very long. As no mechanical structural parts are necessary for interlocking, the controllable valve 1 according to the invention is suitable for miniaturisation. The fluid supply line 6 and the fluid discharge line 7 can have an accordingly small diameter, for example a diameter of less than 1 cm. As the controllable valve 1 according to the invention displays a flow of current only for a short time during the immediate switching process, the amount of electrical power converted is low, leading in turn to low thermal waste heat.

A further advantage of the controllable valve 1 according to the invention consists in the fact that its very low energy consumption makes it suitable to be battery-operated.

In a possible embodiment, the magnetic coil 2 for actuating the valve 1 is excited by a DC voltage supplied by a battery. As a result of the short duration of the electrical excitation of the magnetic coil 2 of for example less than 500 msec, the battery is in this case subjected to just low loads. In a possible embodiment of the controllable valve 1 according to the invention, said control valve comprises a local power supply with a battery integrated therein. The battery may be a rechargeable battery or a storage battery. In a possible embodiment, this controllable valve 1, including an integrated battery, can be inserted into a structural component or a structural part of an aircraft. The aircraft may be any desired aircraft, in particular an aeroplane or a helicopter. The low-flammability fluid which can be switched by the controllable valve 1 can be any desired liquid or a liquid mixture. Alternatively, the fluid may also be a gas or gas mixture. In a possible embodiment, the gas flowing through the fluid supply line 6 and the fluid discharge line 7 is under a high pressure.

In a possible embodiment, a DC voltage supply network of the aircraft applies a DC voltage of for example 28 volts to the magnetic coil 2 of the controllable valve 1 for the purposes of excitation. In an alternative embodiment, this DC voltage is lower and is for example only 12 or 6 volts. In a further embodiment, a battery or a storage battery serves as a standby or substitute power source, in particular in the event of failure of a central DC voltage supply in the aircraft. On account of the design of the controllable valve 1 according to the invention and the provision of permanent magnets, the required tensile force, which is required by the magnetic coil 2 for the movement of the structural element 3, is low, in particular at a low weight of the structural element 3, so that the controllable valve 1 according to the invention requires, upon a brief electrical excitation of less than 500 msec, only a low DC voltage for acting on the magnetic coil 2. The lower the DC voltage required for the excitation of the magnetic coils 2, the lower a risk of explosion also is in the event of fuel escaping. The controllable valve 1 according to the invention is therefore distinguished by very high protection from ignition of a high-flammability fluid and greatly reduces the risk of fire within an aircraft.

The invention further provides a method for controlling a mass flow of a low-flammability fluid, an electrically excited magnetic coil 2 linearly moving a structural element 3 from a first position to a second position and the structural element 3 being held by a permanent magnet after completion of the electrical excitation of the magnetic coil 2, the mass flow of the fluid being interrupted or diverted as a result of the movement of the structural element 3. This method can be carried out in particular under the supervision of a control program run by a control unit or a microprocessor.

The invention claimed is:

1. An aircraft comprising a low-flammability fluid controller with at least one controllable valve for controlling a low-flammability fluid wherein the aircraft comprises:
    a first magnetic coil moving, upon electrical excitation, a structural element provided therein from a first position, counter to a holding force of a first permanent magnet, to a second position in which the structural element is held by a second permanent magnet after completion of the electrical excitation of the first magnetic coil,
    a second magnetic coil moving, upon electrical excitation, the structural element from the second position, counter to a holding force of the second permanent magnet, to the first position in which the structural element is held by the first permanent magnet after completion of the electrical excitation of the second magnetic coil,
    wherein the valve comprises a first fluid line, a second fluid line and a third fluid line,
wherein in one of the two positions of the structural element, the third fluid line is connected to the first fluid line and separated from the second fluid line, wherein the structural element closes the second fluid line, and
    wherein in the other of the two positions of the structural element the third fluid line is connected to the second fluid line and separated from the first fluid line, wherein the structural element closes the first fluid line.

2. The aircraft according to claim 1, wherein said controllable valve comprises the two permanent magnets,
    wherein the first permanent magnet holds said structural element in the first position before the electrical excitation of the first magnetic coil,
    and wherein the second permanent magnet holds said structural element in the second position after completion of the electrical excitation of the second magnetic coil.

3. The aircraft according to claim 1, wherein a tensile force exerted by the first magnetic coil on said structural element upon electrical excitation is greater than an opposing holding force exerted by said first permanent magnet on said structural element and a tensile force exerted by the second magnetic coil on the structural element upon electrical excitation is greater than an opposing holding force exerted by the second permanent magnet on the structural element.

4. The aircraft according to claim 1, wherein said structural element comprises an opening or a taper which, in one of the two positions of said structural element, connects the third fluid line to the first fluid line and which, in the other of the two positions of the structural element, connects the third fluid line to the second fluid line.

5. The aircraft according to claim 4, wherein the fluid conveyed in said fluid lines comprises a gas, a gas mixture, a liquid or a liquid mixture.

6. The aircraft according to claim 1, wherein said structural element is cylindrical and moves linearly in a cylindrical housing.

7. The aircraft according to claim 6, wherein said structural element is made of metal and has two end faces comprising ferromagnetic material.

8. The aircraft according to claim 1, wherein the first and the second magnetic coils are activated by a controller.

9. The aircraft according to claim 8, wherein a duration of the electrical excitation of at least one of the first and second magnetic coils is less than 500 msec.

10. The aircraft according to claim 1, wherein the low-flammability controller is a hydraulic controller or a water controller, and the low-flammability fluid is a hydraulic fluid or water.

11. A method for controlling a mass flow of a low-flammability fluid in the aircraft according to claim 1, comprising:
electrically exciting a first magnetic coil to move a structural element from a first position to a second position; and
completing the electrical excitation of the magnetic coil and holding the structural element in the second position by a permanent magnet,
wherein the mass flow of the fluid being interrupted or diverted as a result of the movement of said structural element.

12. The aircraft according to claim 1, wherein the first and the second fluid lines are fluid discharge lines and the third fluid line is a fluid supply line.

13. The aircraft according to claim 1, wherein the first and the second fluid lines are fluid supply lines and the third fluid line is a fluid discharge line.

14. The aircraft according to claim 1, wherein the low flammability fluid is a low flammability gas, a gas mixture, a low flammability liquid, or a low flammability liquid mixture.

15. The aircraft according to claim 1, wherein the structural element is produced from one piece.

* * * * *